Dec. 26, 1950     C. E. MORGENSTERN ET AL     2,535,748
WRINGER HEAD MECHANISM
Filed Jan. 18, 1946     3 Sheets-Sheet 1
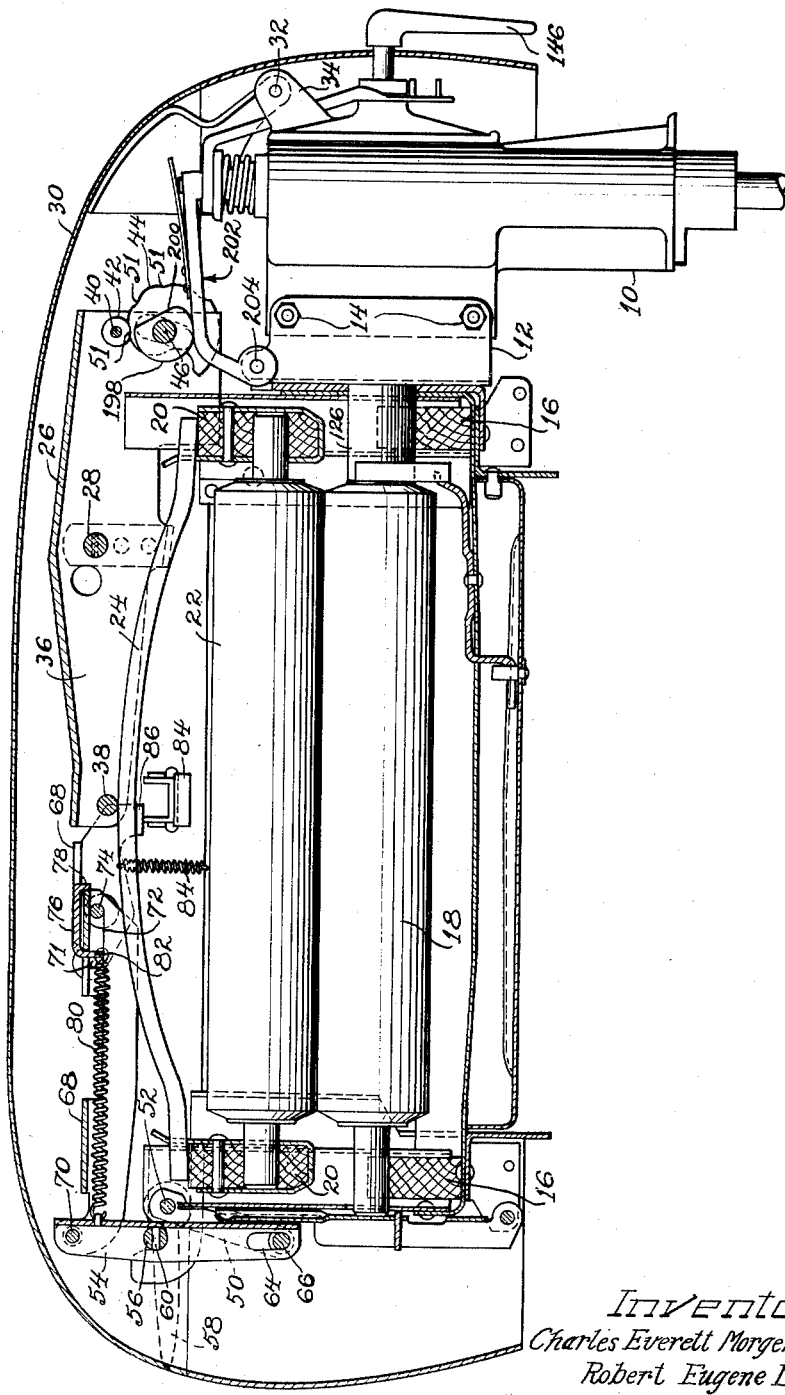
Inventors
Charles Everett Morgenstern
Robert Eugene Lake

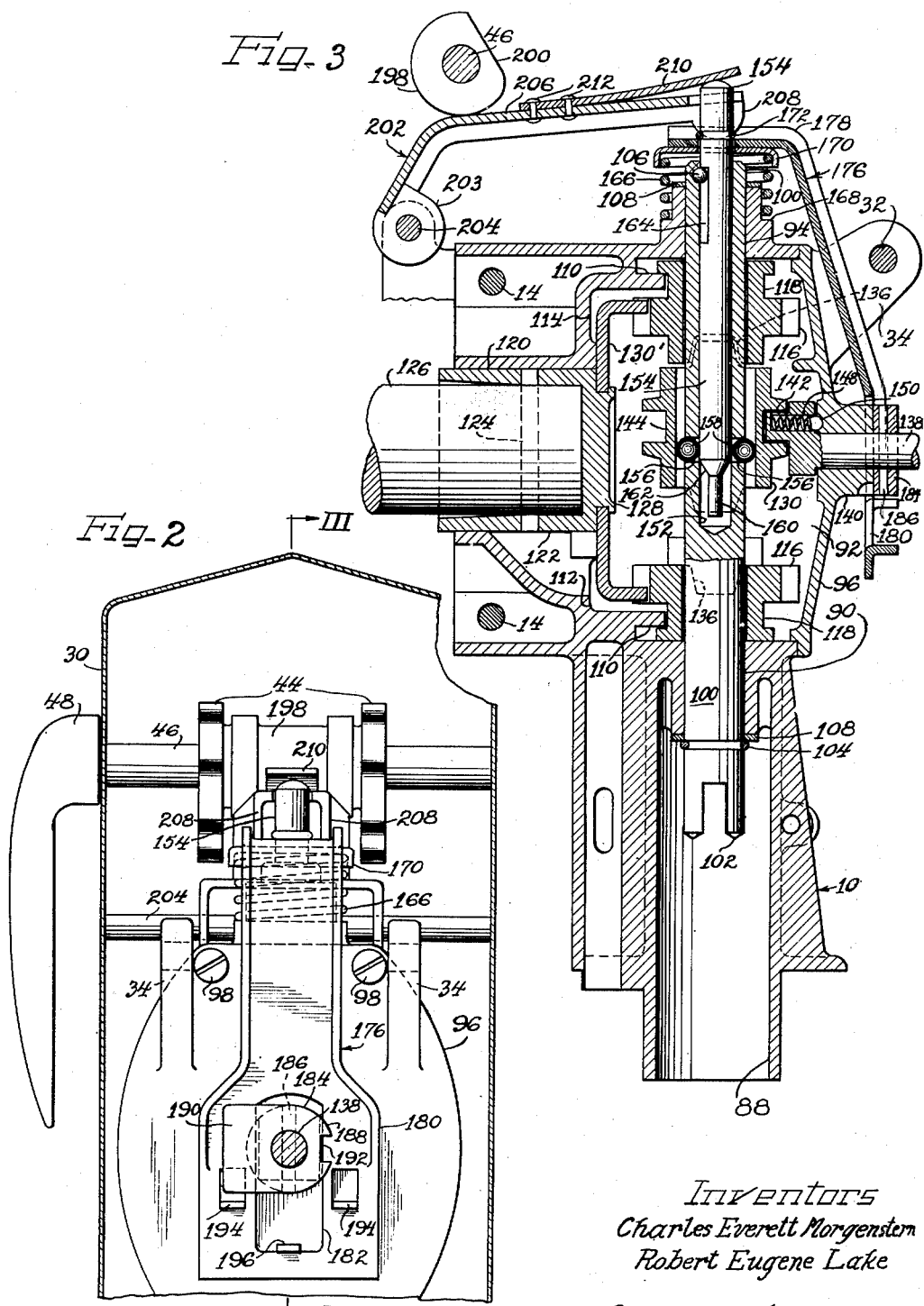

Dec. 26, 1950     C. E. MORGENSTERN ET AL     2,535,748
WRINGER HEAD MECHANISM
Filed Jan. 18, 1946     3 Sheets-Sheet 3
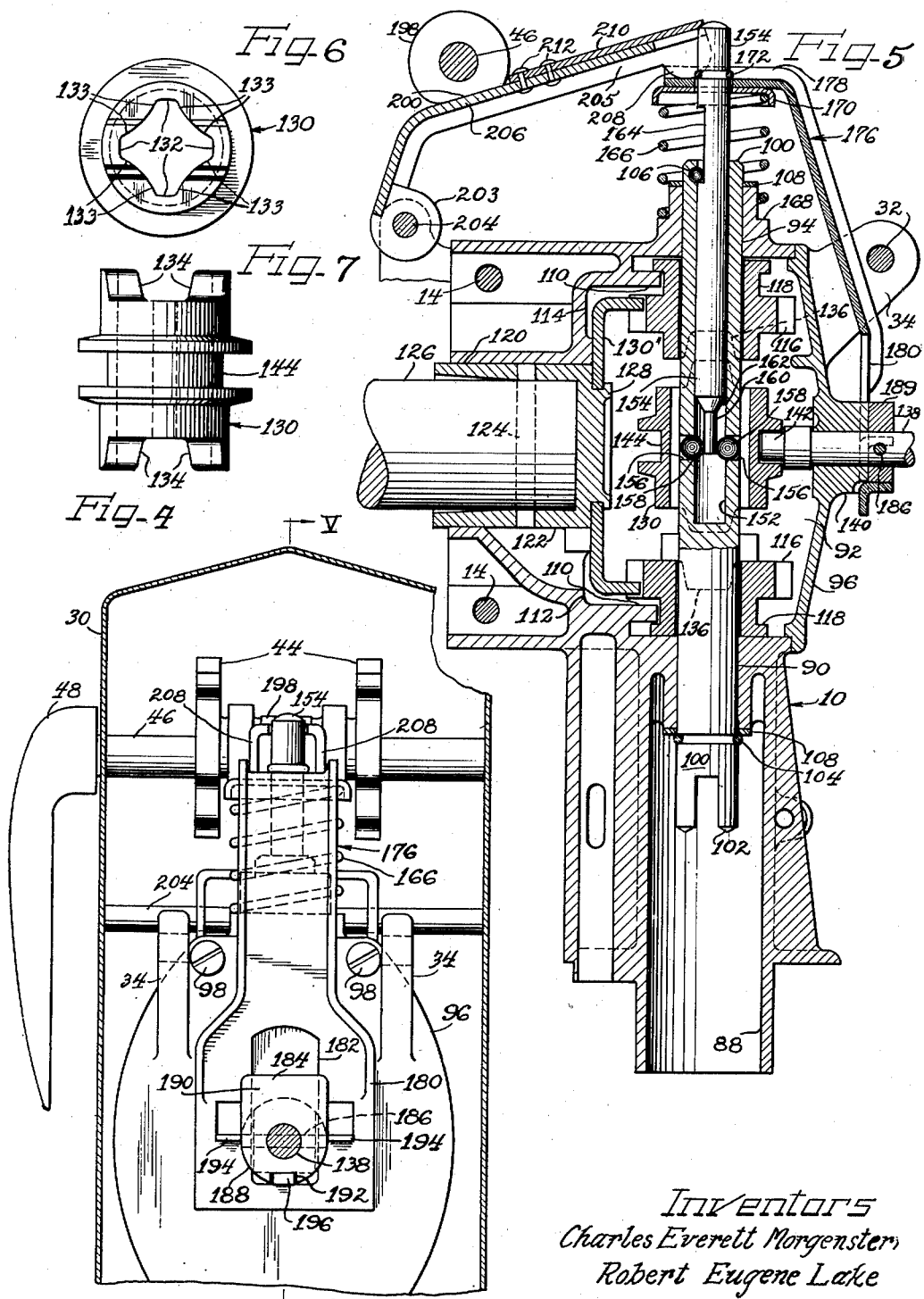
Inventors
Charles Everett Morgenstern,
Robert Eugene Lake Patented Dec. 26, 1950

2,535,748

UNITED STATES PATENT OFFICE 2,535,748

WRINGER HEAD MECHANISM

Charles Everett Morgenstern and Robert E. Lake, St. Joseph, Mich., assignors to Nineteen Hundred Corporation, St. Joseph, Mich., a corporation of New York Application January 18, 1946, Serial No. 641,931

15 Claims. (Cl. 68—253)

This invention relates to a wringer head mechanism for a domestic washing machine, and particularly to a driving mechanism for wringer rolls of the class wherein the release of pressure on the wringer rolls produced intentionally or by operation of a safety device causes an immediate uncoupling of the driving mechanism from the wringer rolls.

Many driving mechanisms for the wringer rolls of a domestic washing machine have heretofore been disclosed in the patented art wherein the operation of a safety device for relieving the pressure on the rolls functioned to interrupt the driving connection to such rolls. Such prior art devices, however, divided mainly into two classes of construction, each of which had its own defects. In the first class, the interruption of the driving connection to the wringer rolls was made independently of the manual control lever customarily provided for reversibly connecting such rolls in driving relation with the drive shaft. Accordingly in this class of prior art devices, after the safety device had been operated to release the roll pressure, the control handle would be left in one of its operative positions. Accordingly, when the operator of the machine cleared the obstruction from between the rolls and again applied the pressure to the rolls, thus resetting the safety device, the rolls would still be connected in driving relationship with the drive shaft and thus would start to rotate independent of any conscious control action by the operator. Such condition is obviously dangerous to the operator and required the operator to always remember to return the control lever to a neutral position before reapplying pressure to the rolls and/or resetting the safety device.

In the other class of prior art constructions, the disconnecting of the driving mechanism following operation of the safety device was accomplished by mechanism operating directly upon the manually operable control lever to return such lever to its neutral position and thus effect the disconnecting operation by the clutch controlled by the manually operable control lever. In constructions of this class, when the safety device had once been tripped, it was possible, by manual operation of the control lever, to reestablish the driving connection between the drive shaft and the rolls without reestablishing pressure upon the rolls or resetting the safety mechanism, permitting a careless operator to operate the machine in this unsatisfactory condition.

Accordingly it is an object of this invention to provide an improved drive mechanism for wringer rolls characterized by the simplicity of its construction and the reliability and safety of its operation.

Another object of this invention is to provide an improved drive mechanism for wringer rolls wherein the actuation of a safety device or pressure control lever for releasing pressure from the rolls produces a positive interruption of the driving connection between the drive shaft and the rolls and will not permit the driving connection to be reestablished except following the resetting of the safety device, the reestablishment of pressure on the rolls, and the manual operation of the wringer drive control lever.

A particular object of this invention is to provide an improved drive mechanism for wringer rolls wherein the operation of a safety device or a pressure control lever for releasing the pressure upon the rolls interrupts the driving connection between the drive shaft and the rolls, returns the wringer drive control lever to a neutral position and locks such drive control lever in its neutral position until the safety device is reset and the roll pressure reestablished.

One particular object of this invention is to provide in a driving mechanism for wringer rolls, an improved clutch for locking a coupling member to a drive shaft, characterized by the utilization of a movable plunger as the controlling member of the clutch and having such plunger spring biased to an uncoupled position but retained in the coupled position through cooperation with the roll pressure mechanism.

Another particular object of this invention is to provide an interlocking member operable between the roll pressure mechanism and a manually operated drive control lever for effecting a driving connection between a drive shaft and the wringer rolls, such interlock being characterized by producing a rotation of the manual control member to its neutral position upon release of roll pressure and locking such manual control lever in its neutral position until the roll pressure is reestablished.

Other and further objects of the invention will be apparent to those skilled in the art from the following detailed description of the annexed sheets of drawings which, by way of preferred examples, illustrate one embodiment of the invention.

On the drawings:

Figure 1 is a longitudinal sectional view of a wringer head and associated driving mechanism of a washing machine embodying this invention;

Figure 2 is a right hand end view of Figure 1

Figure 3 is a sectional view taken along the plane III—III of Figure 2 with parts omitted for clarity;

Figure 4 is a view similar to Figure 2 but showing the components in their relationship when the roll pressure has been relieved; and Figure 5 is a sectional view taken along the plane V—V of Figure 4.

Figures 6 and 7 are respectively plan and elevational views of the coupling sleeve employed in the mechanism.

As shown on the drawings:

In accordance with this invention, a hollow drive shaft is mounted in the customary vertical wringer support post of a washing machine upon which is supported the wringer head and the driving mechanism. The usual reversing gears for driving the wringer rolls are freely mounted on the drive shaft in opposed relation. Intermediate the reversing gears a coupling member is both slidably and rotatably mounted on the drive shaft and is shiftable into engagement with one or the other of the reversing gears by an eccentric, which in turn is operated by a rotatable manual control lever preferably disposed outside of the casing of the wringer head.

To couple the coupling member to the drive shaft in any of its axial positions thereon, a plurality of radial apertures are provided in the drive shaft and in each aperture a locking ball is mounted for radial movement relative to the drive shaft. A plurality of longitudinally extending grooves are provided in the bore of the coupling member and the locking balls are urged outwardly into such grooves to effect a driving relationship between the drive shaft and the coupling member, or retracted inwardly to uncouple the coupled member from the drive shaft. Radial movement of the locking balls is controlled by the axial position of a plunger which is slidably mounted in the hollow bore of the drive shaft. A spring is provided at the top of the drive shaft which urges the plunger axially into its position permitting the locking balls to retract within the drive shaft, and thus uncoupling the coupling member from the drive shaft. The plunger, however, is maintained in its coupled position against the bias of the spring by a latching arrangement which is in turn controlled by the wringer pressure release mechanism. The wringer pressure release mechanism may take one of several well known forms which function as a safety device or as a manual control to release the pressure on the wringer rolls. The connections between the wringer release mechanism and the latching arrangement are such that the release of the roll pressure removes the latch from the plunger and the plunger is immediately withdrawn from its coupled position by the spring.

In accordance with this invention an interlocking member is provided which interconnects the safety device with the manual control lever. In the preferred embodiment of this invention, the interlocking member has one end connected to the plunger and moves with such plunger when the latter is released by operation of the safety device. The other end of the interlock cooperates with a cam secured to the manual drive control lever to return such lever to its neutral position upon release of the plunger, thus moving the coupling member out of engagement with the selected one of the reversing gears.

A particular feature of this invention lies in the provision of a member on the interlock which cooperates with the manual operating lever to lock the same in its neutral position so long as the interlock remains in its position corresponding to the tripped position of the plunger and safety device.

Referring to the drawings, the numeral 10 indicates a wringer head support post which, as will be understood to those skilled in the art, is pivotally mounted at its bottom end to a washing machine (not shown), the pivotal mounting permitting the wringer head to pivot relative to the washing machine in the customary manner. A wringer frame 12 is suitably secured to support post 10 as by the bolts 14. Suitably mounted within the wringer frame 12 are lower roll bearings 16 which rotatably support a lower wringer roll 18. Upper roll bearings 20 are slidably mounted in wringer frame 12 for vertical movement relative thereto and rotatably support upper roll 22.

A leaf type roll pressure spring 24 is provided comprising a bowed member having each end supported by one of the upper roll bearings 20. Downward pressure on the spring 24 is provided by a lever arm 26 (which will be described in more detail later) which is pivotally secured to a hollow wringer head casing 30 by means of a transverse pin 28. The casing 30 is suitably shaped to enclose all of the wringer mechanism, leaving of course suitable openings for access to the rolls 18 and 22, and is pivotally secured to the support post 10 by means of a transverse pin 32 which engages two spaced upstanding ears 34 integrally formed on the cover 96 secured to support post 10.

The lever 26 comprises a substantially channel-shaped member having downwardly depending sides 36 which are disposed in straddling relation to the leaf spring 24. A transverse pin 38 is mounted in lever 26 at a position overlying the central part of spring 24 and downward pressure exerted by the lever 26 on spring 24 is transmitted through the pin 38. At the opposite end of the lever 26, a transverse pin 40 is provided and a roller 42 is rotatably mounted on the pin 40.

The right half end of the lever 26 is selectively positioned in a plurality of successively higher positions by a pair of identical rotating cams 44 which are mounted on a transverse pin 46 in the casing 30 and rotated by a handle 48 disposed exteriorly of the casing 30 (Figure 2). The periphery of cams 44 is provided with suitable notches 51 at each of their selective positions and the force exerted by the leaf spring 24 through lever 26 thus resiliently positions the cams 44 in each of their plurality of selective positions. Since the right hand end of the casing 30 is secured to support post 10, it is therefore apparent that when the left hand end is likewise secured relative to support post 10, a plurality of increasing downward pressures can be applied to the top roll 22 by the action of the lever 26 on the spring 24 as the cam 44 is successively rotated relative to the lever 26.

To releasably secure the left end of the wringer casing 30 as viewed in Figure 1 to the wringer frame 12, a linkage is provided which constitutes the major elements of a wringer safety release device. A primary link 50 is pivotally secured to the wringer frame 12 on a transverse pin 52 located at the left end of the frame as viewed in Figure 1 and in a position adjacent the top of the upper roll bearing 20. The primary link 50 is rigidly secured to pin 52 and, if desired, a handle 58 may be rigidly secured to pin 52 outside the wringer casing 30. A secondary link 54 is pivotally secured to the casing 30 on a transverse pin 56. The pin 56 is secured to the secondary link 54 for co-rotation by means of a pin 60. Secondary link 54 comprises a channel-shaped member and its pivotal mounting at the pin 56 is located in a medial position along its length. One end of secondary link 54 is provided with an elongated slot 64 which accommodates a transverse pin 66 which secures the secondary link 54 to primary link 50. The other end of secondary link 54, that is the top end as viewed in Figure 1, is pivotally secured to one end of a generally channel-shaped locking member 68 by means of a transverse pin 70. The other end of locking member 68 is provided with a longitudinally extending slot 72 which receives a transverse pin 74 mounted in casing 30 and thus supports the locking member 68 for pivotal and longitudinal movement within the casing 30.

With the construction thus far described, it is apparent that when the casing is in its operating position illustrated in Figure 1, the left end of casing 30 will be secured against any pivotal mounting about its supporting pin 32 in the right end thereof so long as clockwise pivotal movement of secondary link 54 is prevented. To prevent such clockwise pivotal movement of secondary link 54, a catch or sear 76 is provided comprising a member generally channel-shaped in cross section which is pivotally mounted on a transverse pin 71 supported by the casing 30 and has a downwardly extending, integral lip 78 which projects into the longitudinal path of movement of locking member 68 to prevent any clockwise pivotal movement of secondary link 54. A spring 80 is provided which operates between secondary link 54 and an integral spring retaining lip 82 formed on sear 76 and thus performs the double function of biasing locking member 68 toward the right as viewed in Figure 1 and imparting a pivotal bias to sear 76 tending to move the sear lip 78 into locking engagement with the front edge of the locking member 68. To increase the pivotal bias on sear 76, an additional spring 84 may be provided, operating between such sear and the wringer casing 30.

It is therefore apparent that counter-clockwise rotation (as viewed in Figure 1) imparted to manual locking lever 58 will pivot the casing 30 about its supporting pivot 32 in a counter-clockwise direction to bring the casing and its associated parts to the position shown in Figure 1, whereupon the sear lip 78 snaps in front of the right hand edge of locking member 68 thereby preventing clockwise rotation of secondary link 54 and hence locking the wringer casing 30 rigidly to the wringer frame 12. In this condition, the manipulation of the pressure control handle 48 to its successive positions will apply increments of pressure to the rolls of the wringer by the progressively increasing deflection of spring 24 produced by the successive positionings of lever 26 by the cam 44.

To rapidly unlock the wringer casing from the wringer frame 12 and thus relieve the pressure on the wringer rolls, a sear trip member 84 is provided which is pivotally mounted in a side wall of wringer casing 30. Sear trip 84 extends through the side wall of casing 30 and is connected to any suitable form of manual operating handle or push plate (not shown). The portion of sear trip 84 disposed within wringer casing 30 underlies a downwardly depending foot portion 86 of sear 76. Hence pivotal movement imparted to sear trip 84 will pivot the sear 76 in a counter-clockwise direction, thus releasing the sear lip 78 from the locking member 68. The pressure then exerted by the spring 24 will act through the lever 26 and its pivotal mounting pin 28 to forcibly pivot the entire casing 30 in a clockwise direction about its pivotal mounting pin 32, thus completely relieving the pressure exerted by spring 24 on the wringer rolls. Concurrently, a suitable spring (not shown) rotates the cam 44 and its attached handle 48 back to a neutral position relative to the roller 42 on the lever 26.

It is desired to particularly point out that the wringer pressure mechanism and the safety release device heretofore described do not form part of this invention except as one element of a combination with other mechanism still to be described. Any other one of several well known forms of wringer pressure producing mechanisms and safety release devices could be readily used in conjunction with the mechanism to be hereafter described.

Referring now more particularly to Figures 3 and 5 of the drawings, the support post 10 comprises a casting having a vertical bore 88 in the bottom portion thereof to accommodate a suitable motor driven shaft (not shown). A coaxially aligned bearing bore portion 90 is provided communicating between the bore 88 and a gear chamber 92. At the top side of gear chamber 92, in axial alignment with bore 88, a second bearing bore 94 is provided. One end face of gear chamber 92 is open and is closed by a suitably shaped cover 96 secured to support post 10 by suitable screws 98. A drive shaft 100 is journaled in the aligned bearing bores 90 and 94 and terminates at its lower end in a bifurcated portion 102 constructed to effect a driving connection with the motor driven shaft (not shown). Drive shaft 100 is secured against axial movement in the bearing bores 90 and 94 by a ring 104 which is snapped into a suitable recess provided in the portion of drive shaft 100 projecting through the bottom of bearing bore 90, and by a transverse pin 106 which projects through drive shaft 100 and cooperates with the top surface of bearing bore 94. Suitable washers 108 may be provided respectively between the ring 104 and the end surface of bearing bore 90 and between the pin 106 and the end surface of bearing bore 94.

Within the gear chamber 92, overhanging, semi-annular, integrally formed lip portions 110 are provided, respectively adjacent the inner walls 112, 114 of gear chamber 92. A pair of reversing gears 116 are freely mounted within the gear chamber 92 in surrounding relation to drive shaft 100 and retained in opposed relationship in the gear chamber by the respective cooperation of the overhanging lip portions 110 with an annular groove 118 provided on the body portion of each of the reversing gears 116.

A bearing bore 120 is formed in support post 10, disposed in radial relationship to the drive shaft 100. A generally cup-shaped driving gear body portion 122 is journaled in bearing bore 120 with the opened end thereof facing the lower wringer roll 18. A transverse pin 124 is provided through body portion 122 which cooperates with the bifurcated end of the lower wringer roll shaft 126 to achieve a detachable driving relation between the gear body portion 122 and the wringer roll 18. On a reduced diameter base portion 128 of body portion 122 which projects into the gear chamber 92, a gear 130' is rigidly secured which is in continuous meshing engagement with each of the reversing gears 116. From the construction thus described it will be apparent that selective rotation of one or the other of the reversing gears will respectively drive the wringer rolls in opposite directions.

To accomplish a selective driving connection between either of the reversing gears 116 and the drive shaft 100, a coupling member 130 is provided, comprising an annular member surrounding drive shaft 100 intermediate the reversing gears 116 and being rotatably and axially movable relative to the drive shaft 100. The bore of coupling member 130 is provided with a plurality of longitudinally extending slots 132 (Figures 6 and 7) which are equally spaced about the periphery of the bore. On each end of coupling member 130, a plurality of axially parallel projecting lugs 134 are provided. Each of the reversing gears 116 is provided with correspondingly shaped recesses 136 to respectively receive the lugs 134 when the coupling member 130 is moved toward one or the other of the reversing gears 116.

To manually control the axial position of coupling member 130 relative to the reversing gears 116, and thus to determine the direction of rotation of the wringer rolls, a control element shaft 138 is journaled in an integrally formed hub portion 140 of cover 96. On the inner end of control shaft 138 a pin 142 is integrally formed, eccentrically located with respect to the axis of control shaft 138. Coupling member 130 is provided with annular groove 144 in the center thereof which receives eccentric pin 142. An operating handle 146 is secured to the outer end of control shaft 138.

Thus by rotation of operating handle 146 the coupling member 130 may be selectively positioned either in engagement with the lower reversing gear 116, or in a neutral position between both reversing gears, or in engagement with the upper reversing gear 116. To resiliently position the control shaft 138 in either of the three selective positions, a recess 148 (Figure 3) is provided in eccentric pin 142 opening adjacent hub portions 140 and a spring-pressed ball detent 150 is mounted in recess 148 and cooperates with suitably spaced indentations in hub portion 140 to resiliently secure the control shaft 138 in any selected one of the three control positions.

To selectively couple the coupling member 130 to drive shaft 100, a ball type clutch unit is employed. The upper end of drive shaft 100 is provided with an axial bore 152 and within such bore a plunger 154 is freely mounted for axial movement. A plurality of radial apertures 156 are provided in drive shaft 100 in the portion thereof lying intermediate the reversing gears 116, and in such apertures a plurality of locking balls 158 are respectively mounted for free radial movement relative to the driving shaft 100. The inserted end portion 160 of plunger 154 is of reduced diameter permitting the locking balls 158 to retract sufficiently within the bore 152 of drive shaft 100 so that the locking balls 158 do not project substantially beyond the surface of drive shaft 100. A conical camming surface 162 connects the reduced diameter portion 160 with the main portion of plunger 154.

The longitudinal grooves 132 provided in coupling member 130 are sufficiently wide to accommodate the locking balls 158 therein when the plunger 154 is axially moved within the bore 152 to a position where the full diameter of plunger 154 is adjacent the locking balls 158. Accordingly, in such position the coupling member 130 is locked to the drive shaft 100 for co-rotation irrespective of its axial position on the drive shaft, that is, irrespective of whether it is in its neutral position or in driving engagement with either of the reversing gears 116, as determined by the position of the control handle 146. It should be noted that the side walls 133 defining the grooves 132 in coupling member 130 are angularly and arcuately inclined so that when the plunger 154 is withdrawn from bore 152 sufficiently to bring the reduced diameter end portion 160 adjacent the locking balls 158, any relative torque between the drive shaft 100 and the coupling member 130 will cam the locking balls 158 radially into the apertures 156 and thus achieve complete uncoupling of the coupling member 130 and the drive shaft 100. The axial movement of plunger 154 in bore 152 is limited to the proper amount to effect coupling and uncoupling movement of locking ball 158 by means of the transverse pin 106 which cooperates with a flat surface 164 provided on plunger 154.

The plunger 154 is axially biased toward its uncoupling position by a spring 166 which surrounds the upper portion of plunger 154 and operates between an annular shoulder 168 formed on support post 10 and an annular spring retainer cap 170 which surrounds the top portion of plunger 154. Retainer cap 170 is secured to plunger 154 by means of a snap ring 172 which engages a suitable annular groove provided in plunger 154. Intermediate spring retainer cap 170 and ring 172, one end 178 of an interlocking member 176 is mounted in surrounding relation to plunger 154 and thus moves vertically with the plunger 154.

The interlock 176 comprises a shallow channel-shaped member having a horizontal end portion 178 which surrounds the top of plunger 154 as heretofore described, and at the other end thereof a substantially vertical portion 180 having an elongated slot-like aperture 182 (Figures 2 and 4) therein, disposed in surrounding relationship to the control shaft 138.

Immediately adjacent the vertical portion 180 of the interlock 176, a cam member 184 is mounted on control shaft 138 and secured thereto for co-rotation by a transverse pin 186. Cam member 184 is generally rectangularly shaped, having a rounded end portion 188 radially formed about the axis of control shaft 138 and a transversely extending, linear sided portion 190 projecting sufficiently to overlie the perimeter of the aperture 182 provided in the interlock 176 in either of the operating positions of the control shaft 138. In the center of rounded portion 188 of the cam 184, a locking notch 192 is provided. A pair of lugs 194 are struck up from the vertical portion 180 of interlock 176 in opposed relationship on each side of the aperture 182 and disposed relative to the extending portions 190 of the cam 184 so that vertically upward movement of the interlock 176, as viewed in Figures 2 through 5, will selectively engage one of said lugs 194 with the extending portion 190 of cam 184 to produce a rotation of the cam back to its neutral position irrespective of which operating position it may previously have been disposed in. A locking lug 196 is struck up from the vertical portion 180 of interlock 176 immediately adjacent the bottom wall of the aperture 182. Locking lug 196 is located so that further upward movement of the interlock 176 after the lugs 194 rotate the operating shaft 138 to a neutral position will engage the locking lug 196 in the locking notch 192 of cam member 184. Thus manual operation of the control shaft 138 is prevented until such time as the interlock 176 is moved downward sufficiently to bring the locking lug 196 out of engagement with the notch 192. It should be further noted that in the event the control shaft 138 is already disposed in its neutral position prior to upward movement of the interlock 176 then the lugs 194 will pass freely along the sides of extending portion 190 of the cam 184 and again locking lug 196 will engage in locking notch 192.

From the construction heretofore described it is readily apparent that when the plunger 154 is permitted to move to its uncoupling position under the bias of spring 166, such movement will not only effect an immediate interruption of the driving relationship between the drive shaft 109 and the wringer rolls but also, through the accompanying vertical movement of the interlock 176, will return the control shaft 138 and its operating handle 146 to a neutral position and furthermore lock such elements in their neutral position by the engagement of locking lug 196 with locking notch 192.

In accordance with this invention, the uncoupling movement of plunger 154 is controlled by the operation of the wringer pressure release mechanism, or, indirectly by operation of the safety device associated with the wringer pressure mechanism. To operatively connect the particular wringer pressure mechanism and safety release heretofore described to the plunger 154, a release cam 198 is rigidly mounted on pin 46 for co-rotation with the wringer pressure adjusting cam 44. The cam 198 comprises a generally circular member concentric about the axis of pin 46 with the exception of a flat surface 200 provided along a portion of its periphery. A latching arm 202 has one end 203 thereof pivotally secured to the wringer frame 12 on a pin 204. The intermediate portion 208 of latching arm 202 lies in engagement with the periphery of cam 198 and the free end 205 of latching arm 202 is provided with two downwardly depending ears 208 which freely surround the extreme top portion of plunger 154 and engage the top surface of the horizontal portion 178 of interlock 176.

The flat surface 200 on cam 198 is angularly located so as to be disposed adjacent the intermediate portion 206 of the latching arm 202 only when roll pressure cam 44 is in a released position relative to the lever 26. This condition can of course occur by tripping of the safety mechanism or by manual rotation of the pressure control handle 48 to its released position. In either event the alignment of flat surface 200 of the cam 198 adjacent the intermediate portion 206 of latching arm 202, permits counter-clockwise rotation of latching arm 202 about the pin 204 sufficient to permit the plunger 154 to move vertically upward to its uncoupling position, thus carrying interlock 176 to its locking relationship with the operating shaft 138.

When the wringer casing 30 is returned to its locking position by counter-clockwise rotation of lever 58, then the rotation of cam 44 by its handle 48 to produce pressure upon the wringer rolls immediately rotates the latching cam 198 to bring the circular portion of its periphery in engagement with the intermediate portion 206 of latching arm 202, thus pivoting latching arm 202 in a clockwise direction about its pivotal mounting pin 204 and accordingly producing a downward movement of the interlock 176 and the retainer cap 170, thereby compressing the spring 166. To provide a resilient axial force on plunger 154 urging it toward its coupled position, rather than a positive force, the central portion of the free end 205 of latching arm 202 is recessed to freely surround plunger 154. Downward force on plunger 154 to move it toward its coupling position relative to coupling member 130 is then effected by a relatively stiff leaf spring member 210 which is secured to latching arm 202 by suitable rivets 212. The latching arm 202 is moved sufficiently downward by the circular portion of latching cam 198 to insure that the interlock 176 in turn moves sufficiently to disengage its cam lugs 194 and locking lug 196 from the cam 184, thus permitting unimpeded manual operation of the wringer drive control handle 146.

The leaf spring connection between latching arm 202 and plunger 154 has the obvious advantage of minimizing wear and strain in the ball clutch when the plunger 154 is moved into its coupling position. At the instant of effecting coupling movement the longitudinal grooves 132 in the coupling member 130 may not be exactly aligned with the locking ball apertures 156. The application of a resilient coupling force to plunger 154 by the leaf spring thus permits the coupling movement of plunger 154 to be delayed until exact alignment of the longitudinal slots 132 and the locking ball apertures 156 is achieved. Such alignment of course is occurring at a cyclic rate determined by the speed of rotation of drive shaft 109. Or, if the drive shaft 109 is not rotating, or in other words if the main motor of the washing machine is not running, the plunger 154 may nevertheless be moved into coupling relation with the coupling member 130 due to the camming action exerted between the locking balls 158 and the inclined side walls 133 of the longitudinal slots 132 of coupling member 130.

From the above description it is apparent that this invention provides a simple, readily manufacturable drive mechanism for wringer rolls characterized by unusual reliability and safety of operation. Furthermore, the drive mechanism herein provided not only effects a complete disconnection of the drive shaft from the wringer rolls upon release of the wringer pressure, but in addition positively returns the manual control handle to a neutral position and locks it in such neutral position until the wringer pressure is reestablished. It is further obvious that the described drive mechanism embodying this invention may be applied to any of the well known forms of wringer pressure producing mechanisms and associated safety devices therefor.

It will, of course, be understood that various details of construction may be varied through a wide range without departing from the principles of this invention, and it is, therefore, not the purpose to limit the patent granted hereon otherwise than necessitated by the scope of the appended claims.

We claim as our invention:

1. A driving mechanism for wringer rolls or the like comprising a hollow driving gear for the wringer rolls, a hollow coupling member engageable with said driving gear for co-rotation, a manually operable lever having a neutral and an operating position for maintaining said coupling member respectively out of and in engagement with said driving gear, a hollow drive shaft freely insertable thru both said hollow driving gear and said hollow coupling member, means including a plunger movable within said drive shaft for locking said coupling member to said drive shaft for co-rotation, and manually controlled means for moving said plunger to unlock said coupling member from said drive shaft.

2. A driving mechanism for wringer rolls or the like comprising a hollow drive shaft, a driving gear for the wringer rolls, a hollow coupling member slidably and rotatably mounted on said drive shaft and axially movable thereon into driving relation with said driving gear, said coupling member having a plurality of longitudinally extending slots in the bore thereof, said drive shaft having a radial aperture therein arranged to communicate with one of said slots in all axial positions of said coupling member, a locking ball mounted in said aperture and radially movable therein between an engaging and a nonengaging relationship with one of said slots, a plunger mounted in said drive shaft for axial movement therein, means on said plunger cooperating with said ball to respectively urge said ball outwardly to couple said coupling member to said shaft in one axial position of said plunger and to permit said ball to move inwardly to a non-engaging position relative to said coupling member in another axial position of said plunger, resilient means urging said plunger axially to its said uncoupling position, a latching member for retaining said plunger in its said coupled position, and manually operable means for releasing said latching member, whereby said driving shaft is automatically uncoupled from said driving gear independent of the axial position of said coupling member.

3. A driving mechanism for wringer rolls or the like comprising a hollow drive shaft, a driving gear for the wringer rolls, a hollow coupling member slidably and rotatably mounted on said drive shaft and axially movable into driving relation with said driving gear, a manually operable control member arranged to selectively axially position said coupling member in either a driving position relative to said driving gear or a neutral position, clutch means for coupling said drive shaft to said coupling member irrespective of the axial position of said coupling member, and manually controlled means for shifting said clutch means to an uncoupled relation between said drive shaft and said coupling member irrespective of the axial position of said coupling member.

4. A driving mechanism for wringer rolls or the like comprising a hollow drive shaft, a driving gear for the wringer rolls, a hollow coupling member slidably and rotatably mounted on said drive shaft and axially movable thereon into driving relation with said driving gear, a manually operable control member arranged to selectively axially position said coupling member in either a driving position relative to said driving gear or a neutral position, said coupling member having a plurality of longitudinally extending slots in the bore thereof, said drive shaft having a radial aperture therein arranged to communicate with one of said slots in all axial positions of said coupling member, a locking ball mounted in said aperture and radially movable therein between an engaging and a nonengaging relationship with one of said slots, a plunger mounted in said drive shaft for axial movement therein, means on said plunger cooperating with said ball to respectively urge said ball outwardly to couple said coupling member to said shaft in one axial position of said plunger and to permit said ball to move inwardly to a non-engaging position relative to said coupling member in another axial position of said plunger, resilient means urging said plunger axially to its said uncoupling position, a latching member for retaining said plunger in its said coupled position, and manually operable means for releasing said latching member, whereby said driving shaft is automatically uncoupled from said driving gear independent of the axial position of said coupling member, and means responsive to said last mentioned means for returning said manually operable control member to its said neutral position.

5. A driving mechanism for wringer rolls or the like comprising a hollow driving gear for the wringer rolls, a hollow drive shaft freely insertable in said hollow driving gear, a hollow coupling member slidably and rotatably mounted on said drive shaft and axially movable into driving relation with said driving gear, a manually operable control member arranged to selectively axially position said coupling member in either a driving position relative to said driving gear or a neutral position, said coupling member having a plurality of longitudinally extending slots in the bore thereof, said drive shaft having a radial aperture therein arranged to communicate with one of said slots in all axial positions of said coupling member, a locking ball mounted in said aperture and radially movable therein between an engaging and a non-engaging relationship with one of said slots, a plunger mounted in said drive shaft for axial movement therein, means on said plunger cooperating with said locking ball to respectively urge said ball outwardly to couple said coupling member to said shaft in one axial position of said plunger and to permit said ball to move inwardly to a non-engaging position relative to said coupling member in another axial position of said plunger, resilient means urging said plunger axially to its said uncoupling position, a latching member for retaining said plunger in its said coupling position, manually operable means for releasing said latching member, whereby said driving shaft is automatically uncoupled from said driving gear, and means responsive to the movement of said plunger to its said uncoupled position for operating said manually operable control member to its said neutral position.

6. In an operating mechanism for wringer rolls, a safety device for releasing roll pressure operable between a cocked and a tripped condition, a driving mechanism for rotating the rolls, manually operated means for controlling the operation of said driving mechanism, said manually operated means being operable between a neutral and a driving position, a first means including a movable plunger operated by tripping of said safety device for disconnecting the drive mechanism independently of said manually operated means, and a second means operated by tripping of said safety device including a member in contact and movable with said plunger for positioning said manually operated means in its said neutral position, said second means including means for locking said manually operated means in its said neutral position while said safety device is in its said tripped condition.

7. In an operating mechanism for wringer rolls, roll pressure control means movable between a pressure applied and pressure released position, a drive shaft, a coupling member for interconnecting said drive shaft and said rolls, manually operable means for selectively engaging said coupling member in driving relation with said rolls, said manually operable means including a control element rotatable between a neutral and a driving position, clutch means including a plunger for coupling said drive shaft to said coupling member, resilient means urging said plunger to its uncoupling position, means operatively connecting said roll pressure control means to said plunger to retain said plunger in coupled position only during said pressure applied condition, an interlock member surrounding and movable with said plunger, said interlock member being connected to said control element to rotate said control element to its said neutral position by the movement of said interlock member produced by movement of said roll pressure control means to pressure released condition, and means on said interlock member for locking said control element in its said neutral position during said pressure released condition.

8. For use in a power driven wringer mechanism having roll pressure control means movable to a pressure released position, the improvements of a disconnecting clutch in the wringer drive, a reversing clutch in the wringer drive, a manual lever for operating said reversing clutch between driving and neutral positions, an axially movable plunger for controlling said disconnecting clutch, an interlock member having one portion thereof surrounding said plunger and movable therewith and another portion engageable with said lever to shift said lever to neutral position upon the occurrence of movement of said plunger in the direction to uncouple said disconnecting clutch, and means for shifting said plunger axially in said uncoupling direction in response to movement of the roll pressure control means to said pressure released position.

9. For use in a power driven wringer mechanism having a roll pressure control means movable to a pressure released position, the improvements of a disconnecting clutch in the wringer drive, a reversing clutch in the wringer drive, a manual lever for operating said reversing clutch between driving and neutral positions, an axially movable plunger for controlling said disconnecting clutch, an interlock member having one portion thereof surrounding said plunger and another portion thereof engageable with said lever to shift said lever to a neutral position by movement of said interlock member in one direction, a spring operating on said interlock member to urge said interlock member reversely of said one direction, an abutment on said plunger engaged by said one portion of said interlock member to impart an axial bias to said plunger in the direction to maintain said disconnecting clutch in released condition, and means responsive to the movement of the roll pressure control means to said pressure released position for concurrently moving said plunger and interlock member.

10. The combination defined in claim 9 wherein the last mentioned means includes a lever operable by said roll pressure control means and having a rigid portion thereof engaged with said one portion of the interlock member and a resilient portion engaged with said plunger.

11. In a wringer having a release means and a reset means, a power drive mechanism to run the wringer rolls comprising a main drive shaft, reversing gears, a shiftable clutch to connect with either of said gears, and releasable torque means disposed between said main drive shaft and said clutch, said torque means comprising movable balls carried by the main shaft, said clutch having grooves to partially receive said balls, and control means to hold said balls in operative driving position within said clutch grooves, said control means having connection with said release means to cause said control means to allow the balls to move out of the clutch grooves into inoperative position during release of the wringer rolls, and said control means having connection with said reset means to actuate the control means to urge said balls into driving position when said wringer rolls are being reset by said reset means.

12. In a wringer having a release means and a reset means, a power drive mechanism to run the wringer rolls comprising a main drive shaft, reversing gears, a shiftable clutch to connect with either of said gears, manually operable means to shift said clutch, and releasable torque means disposed between said main drive shaft and said clutch, said torque means comprising movable balls carried by the main shaft, said clutch having grooves to partially receive said balls, and control means to hold said balls in operative driving position within said clutch grooves, said control means having connection with said release means to cause said control means to allow the balls to move out of the clutch grooves into inoperative position during release of the wringer rolls, and said control means having connection with said reset means to actuate the control means to urge said balls into driving position when said wringer rolls are being reset by said reset means, and interlock mechanism connected between said control means and the manually operable means to automatically shift the latter into neutral position when the drive to said clutch is interrupted.

13. In a wringer having a release means and a reset means, a power drive mechanism to run the wringer rolls comprising a main drive shaft, reversing gears, a shiftable clutch to connect with either of said gears, manually operable means to shift said clutch, and releasable torque means disposed between said main drive shaft and said clutch, said torque means comprising movable balls carried by the main shaft, said clutch having grooves to partially receive said balls, and control means to hold said balls in operative driving position within said clutch grooves, said control means having connection with said release means to cause said control means to allow the balls to move out of the clutch grooves into inoperative position during release of the wringer rolls, and said control means having connection with said reset means to actuate the control means to urge said balls into driving position when said wringer rolls are being reset by said reset means, and interlock mechanism connected between said control means and the manually operable means to automatically shift the latter into neutral position when the drive to said clutch is interrupted, said interlock mechanism having latch means to hold the manually operable means against operation during the drive interruption interval.

14. In an operating mechanism for wringer rolls, roll pressure control means movable between a pressure applied and pressure released position, a drive shaft, a coupling member for interconnecting said drive shaft and said rolls, manually operable means for selectively engaging said coupling member in driving relation with said rolls, said manually operable means including a control element rotatable between a neutral and a driving position, clutch means including a plunger for coupling said drive shaft to said coupling member, resilient means urging said plunger to its uncoupling position, means operatively connecting said roll pressure control means to said plunger to retain said plunger in coupled position only during said pressure applied condition, an interlock member extending around opposite sides of and movable with said plunger, said interlock member being connected to said control element to rotate said control element to its said neutral position by the movement of said interlock member produced by movement of said roll pressure control means to pressure released condition, and means on said interlock member for locking said control element in its said neutral position during said pressure released condition.

15. For use in a power driven wringer mechanism having roll pressure control means movable to a pressure released position, the improvements of a disconnecting clutch in the wringer drive, a reversing clutch in the wringer drive, a manual lever for operating said reversing clutch between driving and neutral positions, an axially movable plunger for controlling said disconnecting clutch, an interlock member having one portion thereof extending around opposite sides of said plunger and movable therewith and another portion engageable with said lever to shift said lever to neutral position upon the occurrence of movement of said plunger in the direction to uncouple said disconnecting clutch, and means for shifting said plunger axially in said uncoupling direction in response to movement of the roll pressure control means to said pressure released position.

CHARLES EVERETT MORGENSTERN.
ROBERT E. LAKE.

REFERENCES CITED

The following references are of record in the file of this patent:

UNITED STATES PATENTS

| Number | Name | Date |
|---|---|---|
| 1,015,254 | Whisler | Jan. 16, 1912 |
| 1,064,785 | Stewart | June 17, 1913 |
| 1,102,427 | Morgan | July 7, 1914 |
| 1,120,663 | Baker | Dec. 15, 1914 |
| 1,177,661 | Svensson | Apr. 4, 1916 |
| 1,686,119 | Beatty | Oct. 2, 1928 |
| 2,071,991 | Varkas | Feb. 23, 1937 |
| 2,133,568 | Perkins | Oct. 18, 1938 |
| 2,281,885 | Litle | May 5, 1942 |
| 2,291,916 | Parish | Aug. 4, 1942 |
| 2,307,367 | Etten | Jan. 5, 1943 |
| 2,371,380 | Cammack | Mar. 13, 1945 |